(12) United States Patent
Wu et al.

(10) Patent No.: US 7,990,725 B2
(45) Date of Patent: Aug. 2, 2011

(54) MODULAR STORAGE SYSTEM FOR STORING A DISK ARRAY

(75) Inventors: Kai-Kuei Wu, Taipei County (TW); Hsiao-Liang Chen, Taipei County (TW)

(73) Assignee: Micro-Star Int'l Co., Ltd., Taipei Hsien (TW)

( * ) Notice: Subject to any disclaimer, the term of this patent is extended or adjusted under 35 U.S.C. 154(b) by 135 days.

(21) Appl. No.: 12/433,918

(22) Filed: May 1, 2009

(65) Prior Publication Data

US 2010/0157520 A1 Jun. 24, 2010

(30) Foreign Application Priority Data

Dec. 18, 2008 (TW) .............................. 97222707 U

(51) Int. Cl.
*H05K 5/00* (2006.01)

(52) U.S. Cl. .................... 361/730; 361/752; 361/800

(58) Field of Classification Search .................. 361/730, 361/747, 752, 790, 797, 800, 788, 756, 727, 361/737, 686, 600, 679; 312/322.1, 322.2
See application file for complete search history.

(56) References Cited

U.S. PATENT DOCUMENTS

| 6,108,198 A * | 8/2000 | Lin | 361/679.39 |
| 6,201,692 B1 * | 3/2001 | Gamble et al. | 361/679.31 |
| 6,317,334 B1 * | 11/2001 | Abruzzini et al. | 361/797 |
| 6,816,368 B2 * | 11/2004 | Yokosawa | 361/679.33 |
| 7,092,245 B2 * | 8/2006 | Shih | 361/679.33 |

* cited by examiner

*Primary Examiner* — Hung S Bui
(74) *Attorney, Agent, or Firm* — Rosenberg, Klein & Lee

(57) ABSTRACT

A modular storage system is provided for storing a disk array consisting of multiple hard disks. Each hard disk is provided with a terminal set. The modular storage system includes a casing having a plurality of disk compartments for receiving the hard disks respectively, a front end defining a front opening and a rear end defining a rear opening; a rear cover for covering the rear opening of the casing; and a plurality of connectors mounted on the rear cover via a coupling mechanism so that each of the connectors is aligned with a respective one of the disk compartments. Once the hard disks are installed respectively in the disk compartments, the terminal set of each of the hard disks is coupled electrically to a respective one of the connectors on the rear cover.

8 Claims, 5 Drawing Sheets

MODULAR STORAGE SYSTEM FOR STORING A DISK ARRAY

This application claims the benefit of the Taiwan Patent Application Serial NO. 097222707, filed on Dec. 18, 2008, the subject matter of which is incorporated herein by reference.

BACKGROUND OF THE INVENTION

1. Field of the Invention

The present invention relates to a disk array, more particularly to a modular storage system for storing a disk array.

2. Description of the Prior Art

Due to advance of the electronic technology, the application of computer in our daily life is very common, since it is easy to store or fetch data in or from the computer. A data file, in text format or video format recording data of a monitor system, can be stored in a server. Therefore, a hard disk plays in important factor for data storage since it can store a relatively large data therein.

Presently, the disk storage system available in the market for storing a disk array generally has a fixed dimension, because the disk array includes a plurality of hard disks (or disk drives) of predetermined size. When changing the types of hard disk, such as replacing 2.5" hard disk with a 3.5" hard disk, the disk storage system should have a similar disk compartment to accommodate the new hard disk therein. Or else, the whole disk storage system must be discarded, thereby causing environment pollution and consequently resulting in extra expense.

Therefore, the object of the present invention is to provide a modular storage system having adjustable disk compartments to accommodate the hard disks of different dimensions. The modular storage system includes a rear cover that is mounted on a casing and that can be detached therefrom. After installing a plurality of electrical connectors on the rear cover and by adjusting position of the partition plates in the disk compartments can change the dimensions of the disk compartments so as to accommodate the hard disks of different dimensions, thereby overcoming the prior art disadvantage.

SUMMARY OF THE INVENTION

The object of the present invention is to provide a modular storage system having a rear cover detached from the casing when changing the hard disks constituting a disk array stored therein, and a re-assembling of the rear cover to the casing and varying thickness of the partition plate for disposing in the casing can result in suitable disk compartments for receiving fittingly the replaced hard disks therein.

A modular storage system is provided according to the present invention for storing a disk array consisting of multiple hard disks. Each hard disk is provided with a terminal set. The modular storage system accordingly includes a casing having a plurality of disk compartments for receiving the hard disks respectively, a front end defining a front opening and a rear end defining a rear opening; a rear cover for covering the rear opening of the casing; and a plurality of connectors mounted on the rear cover via a coupling mechanism so that each of the connectors is aligned with a respective one of the disk compartments. Once the hard disks are installed respectively in the disk compartments, the terminal set of each of the hard disks is coupled electrically to a respective one of the connectors on the rear cover.

The modular storage system of the present invention further includes a partition plate for disposing in the casing so as to form the plurality of disk compartments. Varying thickness of the partition plate results in changing dimension of a respective one of the disk compartments in order to receive a respective one of the hard disks.

Therefore, the modular storage system of the present invention can not only accommodate several of the hard disks but also the hard disks of different dimensions. Moreover, by varying the thickness of the partition plate in the casing, the volume or dimension of the disk compartments can be altered in order to receive the hard disks constituting the disk array, thereby avoiding the problems of discarding the storage system due to lack of suitable disk compartments encountered during use of the prior art storage system.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
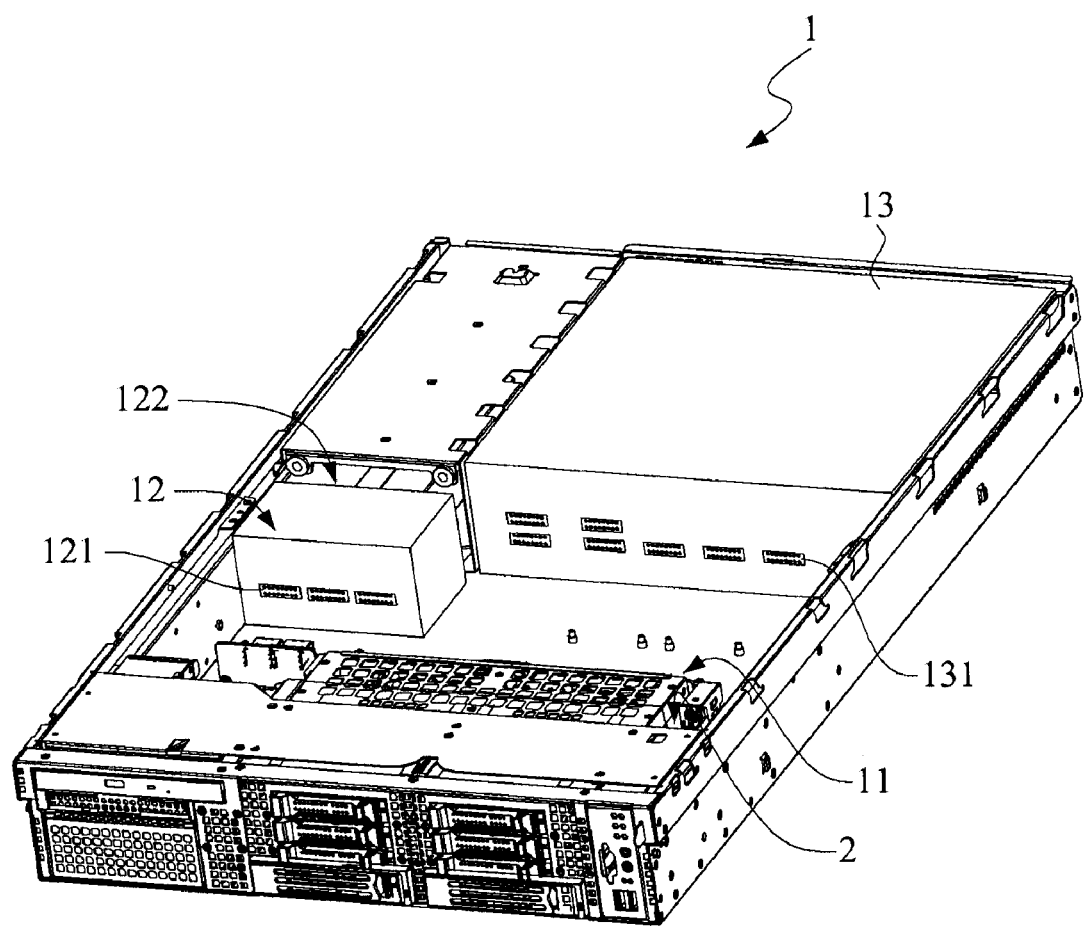
FIG. 1 is a perspective view of a modular storage system of the present invention for storing a disk array.

FIG. 1 is a perspective view of a modular storage system 1 of the present invention for storing a disk array 2.

The modular storage system 1 of the present invention includes a casing confining a receiving space 11 therein, a power supply 12 and a control unit 13. The disk array 2 includes a plurality of hard disks (or disk drives) of different dimensions to be stored within the casing, as best shown in FIG. 2.

The hard disks 30 constituting the disk array 2 can be accommodated within the casing, a detailed of which will be explained in the following paragraphs. The power supply 12 includes a plurality of output ports 121 respectively and electrically connected to the hard disks, and a plurality of input ports 122 for receiving electrical power from an external power source so that each hard disk is supplied with a required power amount. The control unit 13 has a plurality of coupling terminals 131 coupled electrically to the hard disks respectively for controlling and for fetching data therefrom.

Figure 2:
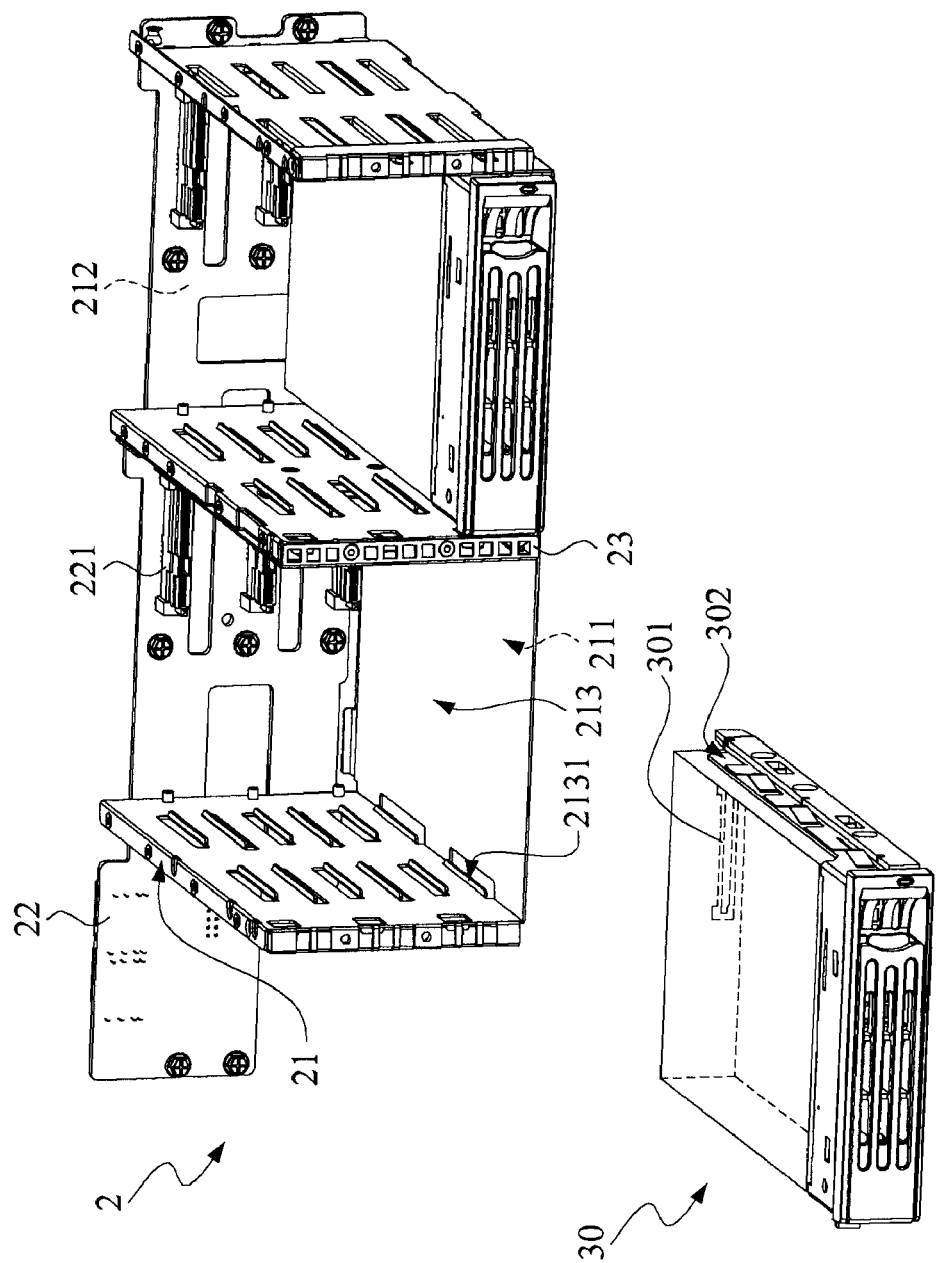
FIG. 2 is a perspective view of the disk array to be stored within the modular storage system of the present invention.

FIG. 2 is a perspective view of the disk array to be stored within the modular storage system of the present invention. The casing 21 confines the receiving space 11 (see FIG. 1) therein, and includes a rear cover 22 and a partition plate 23. As illustrated, the hard disks 30 (only one is shown in the drawing) can be inserted detachably into the casing 21.

The casing 21 has a plurality of disk compartments 213 for receiving the hard disks 30 respectively, a front end defining a front opening 211 and a rear end defining a rear opening 212 of the casing 21. Note that the disk compartments 213 occupy a portion of the receiving space 11 while the control unit 13 and the power supply 12 occupy the remaining portion of the receiving space 11 in the casing (see FIG. 1). Each disk compartment 213 has two opposite side walls provided with two guide rails 2131.

The rear cover 22 is disposed behind the casing 21 for covering the rear opening 212. A plurality of connectors 221 are mounted on the rear cover 22 such that each of the connectors 221 is aligned with a terminal set 301 of a hard disk 30 in a respective one of the disk compartments 213. Each connector 221 further has an outer portion coupled electrically to the power supply 12 and the control unit 13. Once the hard disks 30 are installed respectively in the disk compartments 213, the terminal set 301 of each of the hard disks 30 is coupled electrically to an inner portion the respective connector 221 on the rear cover 22.

The partition plate 23 is disposed in the casing 21 and fastened securely to an upper cover (not visible in the drawing) and a bottom cover so as to form the plurality of disk compartments 213. By varying thickness of the partition plate 23, dimension of a respective one of the disk compartments 213 can be changed in order to receive a respective one of the hard disks 30. In other words, adjustment in the thickness of the partition plate 23 results in changing the dimension of the respective disk compartment 213 for complementing with the hard disk 30 to be kept therein. After formation of the disk compartment 213, the hard disk 30 can be inserted therein via the front opening 211 of the casing 21.

Figure 3:
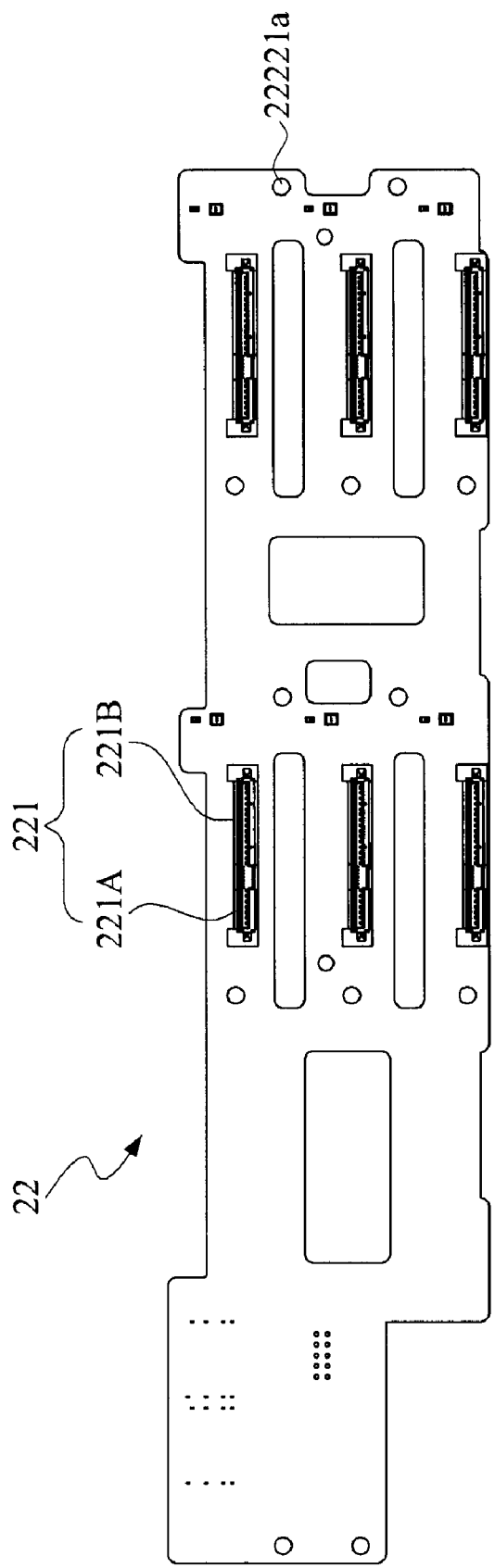
FIG. 3 shows a rear view of the disk array to be stored within the modular storage system of the present invention.

Referring to FIGS. 2 and 3, after assembly, each of the connectors 221 on the rear cover 22 is aligned with the respective disk compartment 213. When the hard disk 30 is inserted into the disk compartment 213, the terminal set 301 of the hard disk 30 is coupled directly to a respective one of the connectors 221 on the rear cover 22. Each connector 221 has a signal terminal 221A coupled electrically to a connection terminal of the control unit 13 and a power terminal 221B coupled electrically to an output port 121 of the power supply 12. The signal terminal 221A of the connector 221 is further coupled to one part of the terminal set 131 of the hard disk 30 for transmission of electrical signal while the power terminal 221B thereof is coupled to the other part of the terminal set 131 of the hard disk 30 for power transmission.

Figure 4:
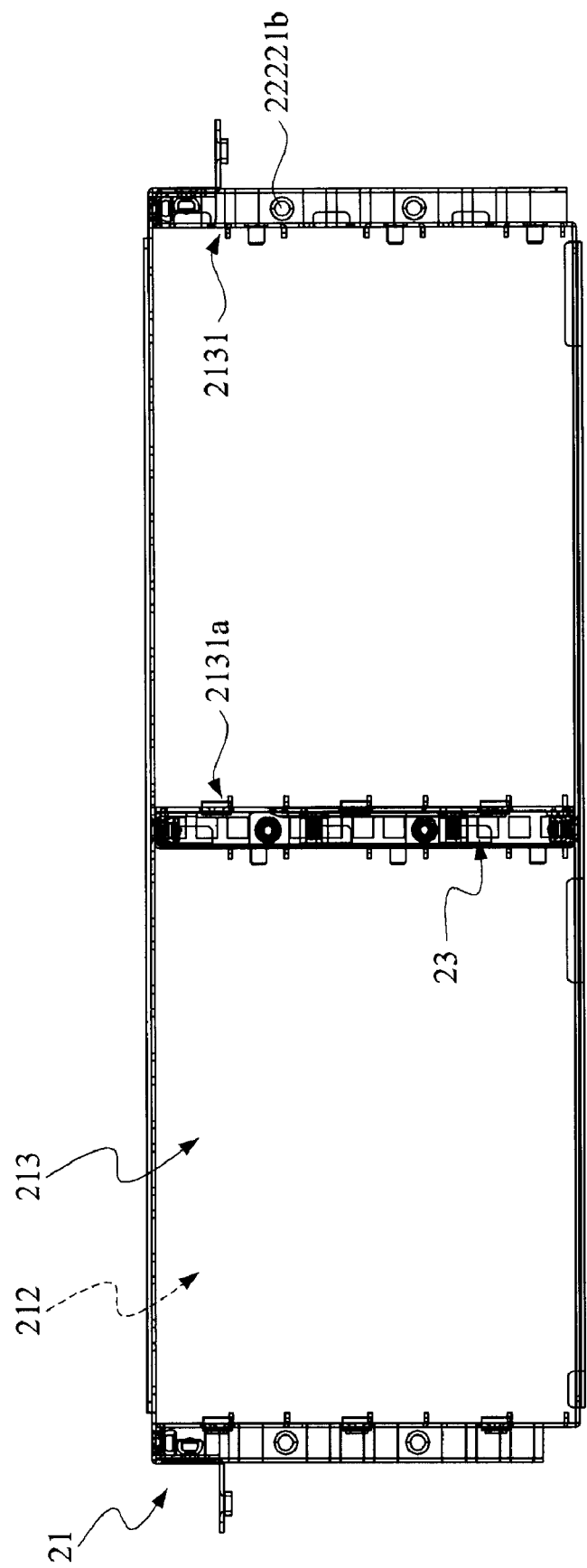
FIG. 4 shows a rear view of a rear cover employed in the disk array to be stored within the modular storage system of the present invention.

FIG. 4 shows a rear view of the rear cover 22 employed in the disk array 2 to be stored within the modular storage system of the present invention. As shown, the rear cover 22 is mounted on to the casing 21 via a coupling mechanism 222 so that a male portion of the coupling mechanism 222 is present at the periphery of the rear opening 212 while a female portion of the coupling mechanism 222 is present on the rear cover 22. Engagement between the male and female portions enables installation of the rear cover 22 on the casing 21, thereby covering the rear opening 212.

In case, the dimension of the disk compartment 213 is different from that of the hard disk 30 such that the connector 221 is unable to complement with the terminal set of the hard disk 30. Under this condition, only the corresponding connector 221 needs to be dismantled from the rear cover 22 and is replaced by a suitable ones. The disk array 2 constituting the major part of the system needs not be altered.

Figure 5:
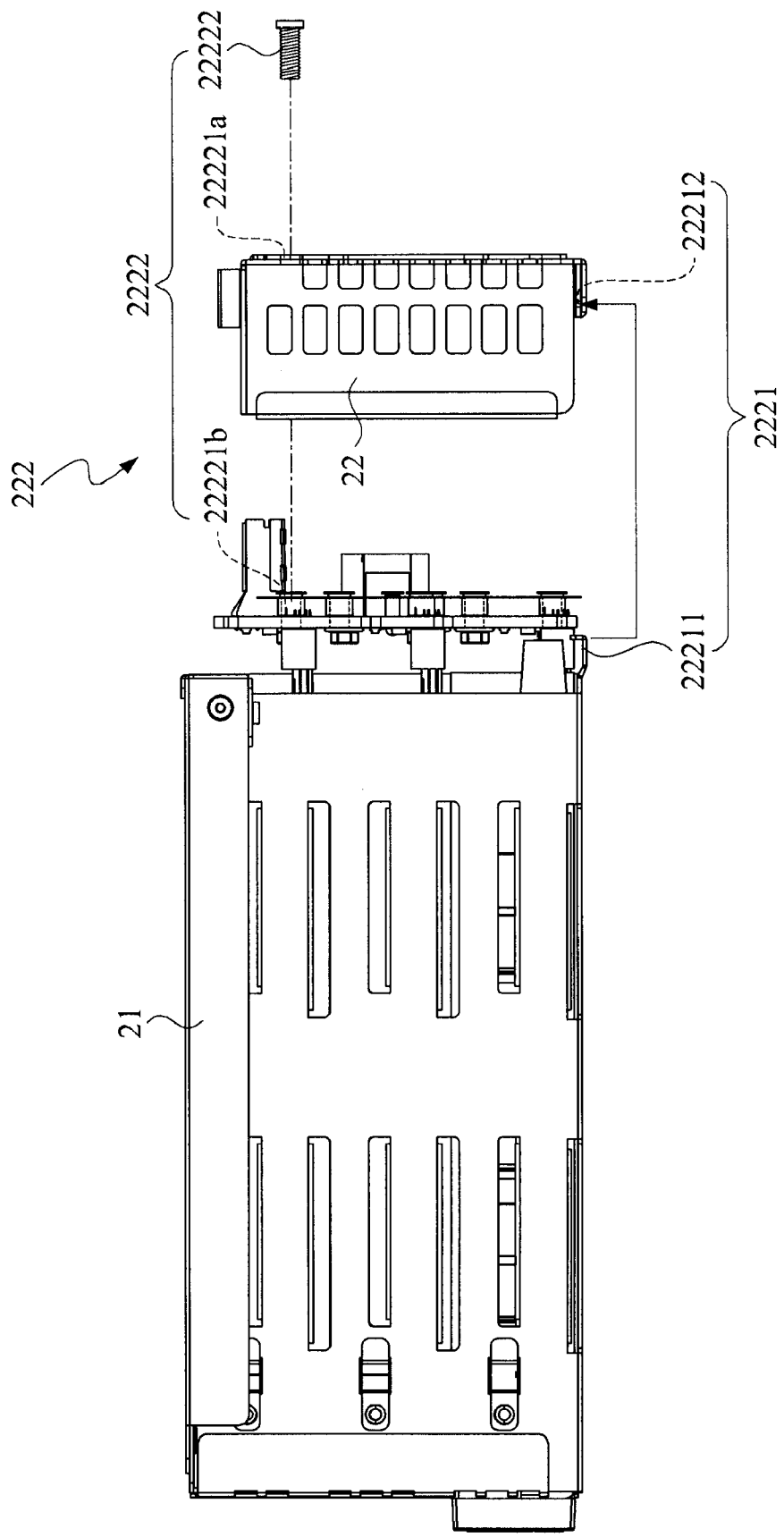
FIG. 5 is a coupling mechanism employed for coupling the hard disks in the disk compartments of the modular storage system of the present invention.

Referring to FIG. 5, the coupling mechanism 222 preferably includes a hook unit 2221 and a fastener unit 2222. Also refer to FIGS. 3 and 4, the hook unit 2221 is mounted on the rear cover 22 and the casing 21 while the fastener unit 2222 is also mounted on the rear cover 22 and the casing 21 so that engagement between the hook unit 2221 and the fastener unit 2222 results in installation of the rear cover 22 on the casing 21.

The hook unit 2221 can be mechanically formed. In one embodiment, the periphery of the rear opening 212 can be formed with a plurality of ribs 22211 while the rear cover 22 may have a plurality of engaging holes 22212 for extension of the ribs 22211, thereby fastening the rear cover 22 over the rear opening of the casing 21. In reverse, the rear cover 22 may have the plurality of ribs 22211 while the periphery of the rear opening 212 is provided with a plurality of engaging holes 22212 for extension of the ribs 22211, thereby fastening the rear cover 22 over the rear opening of the casing 21. The fastening unit 2222 can be mechanically formed. In one embodiment, the rear cover 22 is formed with a plurality of threaded holes 2221a while the casing 21 is formed with a plurality of threaded holes 2221b respectively aligned with the holes 2221a so that a plurality fastener screws 22222 can be fastened securely in the holes 22221a, 22221b. Since the hook unit 22221 permits easy detachment the assembling of the storage system 1 of the present invention is facilitated.

Referring again to FIGS. 2 and 4, the partition plate 23 has two opposite wall surfaces formed with two guide rails 2131a complementing with the rails 2131 of the disk compartment 213. By varying thickness of the partition plate 23 results in changing dimension of a respective disk compartment 213 in order to receive a respective one of the hard disks 30.

Each of the hard disks 30 has an interference mechanism 302 for associating with the guide rails 2131 in the disk compartment 213 so as to permit installation of the hard disk 30 in a respective one of the disk compartments 213. After insertion of the hard disk 30 into the disk compartment, the assembler at the production site can easily connect the terminal set 301 of the hard disk 30 to the respective connector 221 on the rear cover 22.

When the hard disk 30a is unable to be inserted into the disk compartment 213 due to different of the dimension, the thickness of the partition plate 23 can be altered. The rear cover 22 is simultaneously replaced by a suitable dimension so as to be correspond with the desired hard disks 30a constituting the disk array 2. Briefly speaking, the hard disks 30 need not be changed, thereby avoiding the problem of discarding the whole disk storage system due to lack of suitable disk compartments encountered during use of the prior art storage system.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A modular storage system for storing a disk array consisting of multiple hard disks, each of which is provided with a terminal set, the modular storage system comprising:
    a casing having a plurality of disk compartments for receiving the hard disks respectively, a front end defining a front opening and a rear end defining a rear opening;
    a rear cover for covering said rear opening of said casing; and
    a plurality of connectors mounted on said rear cover via a coupling mechanism so that each of said connectors is aligned with a respective one of said disk compartments;
    a partition plate having a plurality of portions, each portion being selectively adjustable in a thickness dimension to engagingly couple with a hard disk;
    wherein, once the hard disks are installed respectively in said disk compartments, the terminal set of each of the hard disks is coupled electrically to a respective one of said connectors on said rear cover.

2. The modular storage system according to claim 1, wherein each of said disk compartments has two opposite side walls provided with two guide rails, each of said hard disks having an interface mechanism for associating with said guide rails so as to permit installation of said each of said hard disks in a respective one of said disk compartments.

3. The modular storage system according to claim 1, wherein each of said connectors has a signal terminal coupled to a portion of said terminal set of a respective hard disk and a power terminal coupled to the other portion of said terminal set of said respective hard disk.

4. The modular storage system according claim 1, wherein said coupling mechanism includes a hook unit and a fastener unit mounted respectively on said rear cover and said casing such that engagement between said hook unit and said fastener unit results in installation of said rear cover on said casing.

5. The modular storage system according to claim 1, wherein the partition plate for disposing in said casing so as to form said plurality of disk compartments, varying thickness of said partition plate resulting in changing dimension of a respective one of said disk compartments in order to receive a respective one of the hard disks.

6. The modular storage system according to claim 5, wherein said partition plate has two opposite wall surfaces formed with two guide rails, each of said hard disks having an interface mechanism for associating with said guide rails so as to permit installation of said hard disk in a respective one of said disk compartments.

7. The modular storage system according to claim 1, wherein said casing defines a receiving space therein for receiving the disk array.

8. The modular storage system according to claim 1, wherein the disk array further includes a control unit and a power supply, said connectors having inner portions connected electrically and respectively to the terminal sets of the hard disks and outer portions connected electrically and respectively to the control unit and the power supply.

* * * * *